(12) United States Patent
Kim et al.

(10) Patent No.: US 12,285,996 B2
(45) Date of Patent: Apr. 29, 2025

(54) METHOD FOR CONTROLLING VEHICLE THERMAL MANAGEMENT SYSTEM

(71) Applicants: Hyundai Motor Company, Seoul (KR); Kia Corporation, Seoul (KR)

(72) Inventors: Tae Han Kim, Seoul (KR); Seung Ho Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 311 days.

(21) Appl. No.: 17/813,399

(22) Filed: Jul. 19, 2022

(65) Prior Publication Data

US 2023/0158860 A1 May 25, 2023

(30) Foreign Application Priority Data

Nov. 22, 2021 (KR) .................... 10-2021-0161624

(51) Int. Cl.
*B60H 1/00* (2006.01)
*B60H 1/32* (2006.01)
*B60K 11/02* (2006.01)
*B60L 58/26* (2019.01)

(52) U.S. Cl.
CPC ..... *B60H 1/00899* (2013.01); *B60H 1/00278* (2013.01); *B60H 1/3205* (2013.01); *B60K 11/02* (2013.01); *B60L 58/26* (2019.02); *B60H 2001/00928* (2013.01); *B60H 2001/327* (2013.01)

(58) Field of Classification Search
CPC ............ B60H 1/00899; B60H 1/00278; B60H 1/3205; B60H 1/00385; B60H 1/004; B60H 1/00392; B60H 1/00921; B60H 2001/00928; B60H 2001/327; B60H 2001/3272; F25B 2700/21154; F25B 2700/2117; F25B 2600/021; F25B 2600/025; F25B 31/006; F25B 49/02; F25B 49/022; B60L 58/26; B60K 11/02
See application file for complete search history.

(56) References Cited

U.S. PATENT DOCUMENTS

2019/0047369 A1* 2/2019 Kim ..................... F25B 21/04
2024/0278622 A1* 8/2024 Kim ..................... B60H 1/3222

FOREIGN PATENT DOCUMENTS

WO WO-2020129494 A1 * 6/2020 ......... B60H 1/00278

OTHER PUBLICATIONS

Translation of WO 2020129494 (Year: 2020).*

* cited by examiner

*Primary Examiner* — Joseph F Trpisovsky
(74) *Attorney, Agent, or Firm* — Slater Matsil, LLP

(57) ABSTRACT

An embodiment method for controlling a vehicle thermal management system includes determining a target temperature of an evaporator by subtracting a predetermined temperature from a measured temperature of the evaporator, in a case in which only interior cooling of a passenger compartment is performed and a measured temperature of an inverter is higher than a threshold temperature, and adjusting an RPM of a compressor in response to the determined target temperature of the evaporator.

7 Claims, 3 Drawing Sheets

METHOD FOR CONTROLLING VEHICLE THERMAL MANAGEMENT SYSTEM

CROSS-REFERENCE TO RELATED APPLICATIONS

This application claims the benefit of Korean Patent Application No. 10-2021-0161624, filed on Nov. 22, 2021, which application is hereby incorporated herein by reference.

TECHNICAL FIELD

The present disclosure relates to a method for controlling a vehicle thermal management system.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

Existing electric vehicles and hybrid vehicles have employed an air-cooled battery cooling system using interior cold air. In recent years, research is underway on a water-cooled battery cooling system that cools the battery by water cooling in order to extend all electric range (AER) to 300 km (200 miles) or more. Specifically, energy density may be increased by adopting a system that cools the battery in a water-cooled manner using a heating, ventilation, and air conditioning (HVAC) system, a radiator, and the like. In addition, the water-cooled battery cooling system may make the battery system compact by reducing gaps between battery cells, and improve battery performance and durability by maintaining a uniform temperature between the battery cells.

In order to implement the above-described water-cooled battery cooling system, research is being conducted on a vehicle thermal management system integrated with a powertrain cooling subsystem for cooling an electric motor and power electronics, a battery cooling subsystem for cooling a battery, and an HVAC subsystem for heating or cooling air in a passenger compartment.

The HVAC subsystem may include an evaporator, a compressor, a condenser, and a refrigerant loop fluidly connected to an expansion valve located on the upstream side of the evaporator, and a refrigerant may circulate through the refrigerant loop.

The powertrain cooling subsystem may include a powertrain coolant loop fluidly connected to the power electronics (an electric motor, an inverter, etc.), and a coolant may circulate through the powertrain coolant loop. The coolant circulating in the powertrain coolant loop may be cooled by an electric radiator.

The battery cooling subsystem may include a battery coolant loop fluidly connected to the battery and a battery chiller, and a coolant may circulate through the battery coolant loop. The battery chiller may be configured to transfer heat between a branch line branching off from the refrigerant loop and the battery coolant loop, and the coolant cooled by the refrigerant in the battery chiller may cool the battery.

The compressor in the HVAC subsystem may be an inverter compressor including an inverter, and the refrigerant may pass through a refrigerant passage adjacent to the inverter so as to properly cool the inverter. When the flow rate of the refrigerant passing through the refrigerant passage is insufficient or the temperature of the refrigerant is relatively high, the inverter may be overheated, and thus the inverter may not be normally controlled or elements of the inverter may be damaged.

The above information described in this background section is provided to assist in understanding the background of the inventive concept, and may include any technical concept which is not considered as the prior art that is already known to those skilled in the art.

SUMMARY

The present disclosure relates to a method for controlling a vehicle thermal management system. Particular embodiments relate to a method for controlling a vehicle thermal management system preventing an inverter of an electric compressor from overheating.

Embodiments of the present disclosure can solve problems occurring in the prior art while advantages achieved by the prior art are maintained intact.

An embodiment of the present disclosure provides a method for controlling a vehicle thermal management system effectively preventing an inverter of an electric compressor from overheating.

According to an embodiment of the present disclosure, a method for controlling a vehicle thermal management system may include determining, by a controller, a target temperature of an evaporator by subtracting a predetermined temperature from a measured temperature of the evaporator when only the interior cooling of a passenger compartment is performed and a measured temperature of an inverter is higher than a threshold temperature, and adjusting the RPM of a compressor in response to the determined target temperature of the evaporator.

As the RPM of the compressor increases, the flow rate of a refrigerant passing through a refrigerant passage adjacent to the inverter may increase, and accordingly the inverter may be properly cooled.

The predetermined temperature may increase as the measured temperature of the inverter increases.

The target temperature of the evaporator may be variably lowered according to the measured temperature of the inverter.

According to another embodiment of the present disclosure, a method for controlling a vehicle thermal management system may include determining, by a controller, a super heat degree of a refrigerant exiting from a battery chiller by subtracting a predetermined temperature from a temperature of the refrigerant measured at an outlet of the battery chiller when the interior cooling of a passenger compartment is not performed, only the cooling of a battery pack is performed, and a measured temperature of an inverter is higher than a threshold temperature, and increasing an opening degree of a chiller-side expansion valve according to the determined super heat degree of the refrigerant.

As the opening degree of the chiller-side expansion valve increases, the flow rate of the refrigerant passing through the refrigerant passage adjacent to the inverter may increase, and accordingly the inverter may be properly cooled.

According to another embodiment of the present disclosure, a method for controlling a vehicle thermal management system may include determining, by a controller, a target temperature of an evaporator by subtracting a predetermined temperature from a measured temperature of the evaporator when the interior cooling of a passenger compartment and the cooling of a battery pack are performed simultaneously and a measured temperature of an inverter is higher than a threshold temperature, increasing a maximum threshold pressure of a refrigerant compressed by a compressor by a predetermined pressure, and increasing the RPM of the compressor according to the increased maximum threshold pressure of the refrigerant.

As the RPM of the compressor increases, the flow rate of the refrigerant passing through the refrigerant passage adjacent to the inverter may increase, and accordingly the inverter may be properly cooled.

The method may further include limiting an opening degree of a chiller-side expansion valve. By limiting the opening degree of the chiller-side expansion valve, the flow rate of the refrigerant passing through a first passage of a battery chiller may be relatively limited, and accordingly an increase in the temperature of the refrigerant passing through the refrigerant passage adjacent to the inverter may be minimized.

The opening degree of the chiller-side expansion valve may be variably limited according to the measured temperature of the inverter.

The opening degree of the chiller-side expansion valve may be reduced as the measured temperature of the inverter increases.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
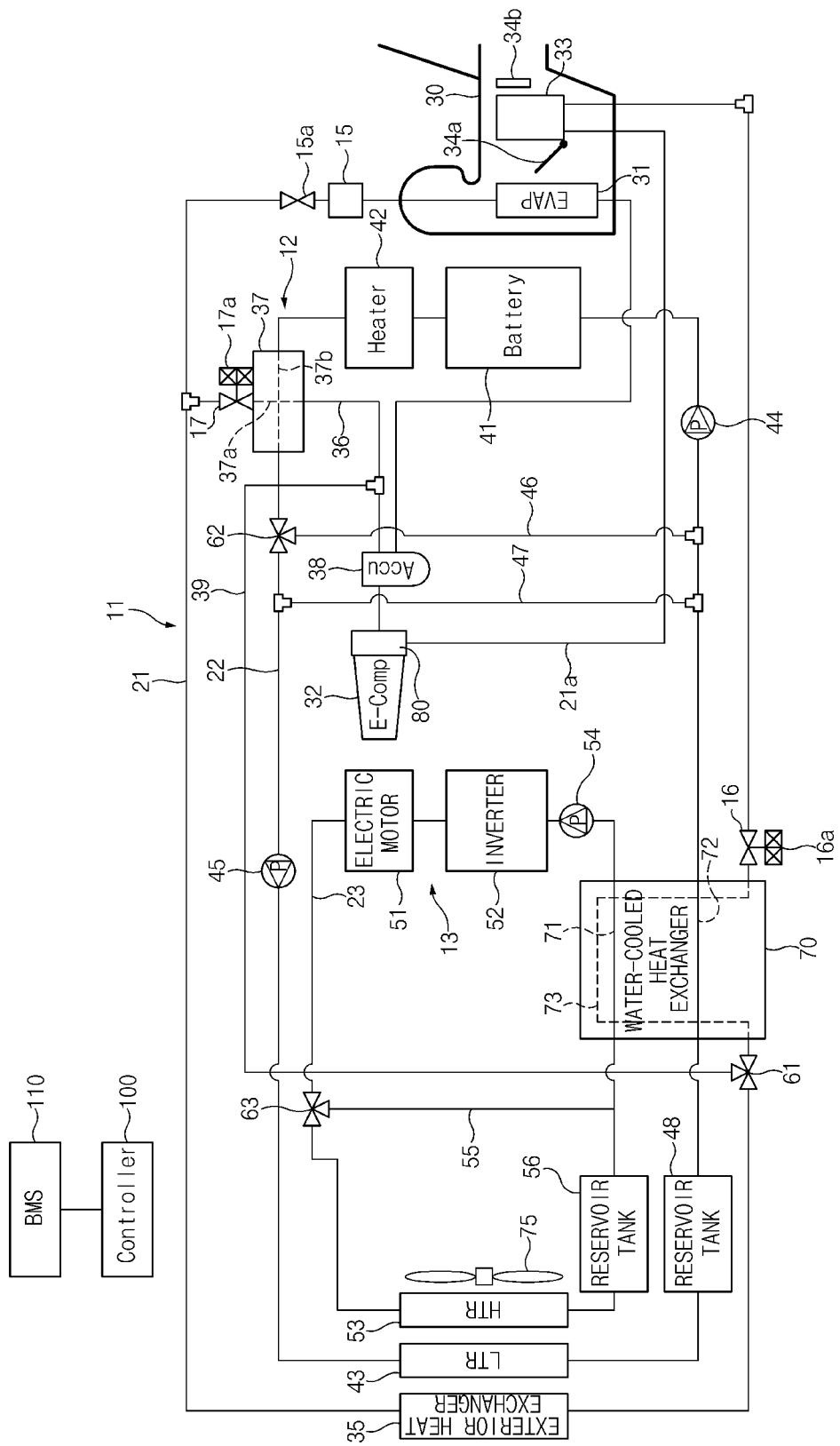
FIG. 1 illustrates a vehicle thermal management system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a heating, ventilation, and air conditioning (HVAC) subsystem 11 including a refrigerant loop 21 through which a refrigerant circulates, a battery cooling subsystem 12 including a battery coolant loop 22 through which a battery-side coolant for cooling a battery pack 41 circulates, and a powertrain cooling subsystem 13 including a powertrain coolant loop 23 through which a powertrain-side coolant for cooling an electric motor 51 and power electronics 52 of a powertrain circulates.

The HVAC subsystem 11 may be configured to heat or cool air in the passenger compartment of the vehicle using the refrigerant circulating in the refrigerant loop 21. The refrigerant loop 21 may be fluidly connected to an evaporator 31, a compressor 32, an interior condenser 33, a heating-side expansion valve 16, a water-cooled heat exchanger 70, an exterior heat exchanger 35, and a cooling-side expansion valve 15. In FIG. 1, the refrigerant may sequentially pass through the compressor 32, the interior condenser 33, the heating-side expansion valve 16, the water-cooled heat exchanger 70, the exterior heat exchanger 35, the cooling-side expansion valve 15, and the evaporator 31 through the refrigerant loop 21.

The evaporator 31 may be configured to evaporate the refrigerant received from the cooling-side expansion valve 15. That is, the refrigerant expanded by the cooling-side expansion valve 15 may be evaporated by absorbing heat from the air in the evaporator 31. During a cooling operation of the HVAC subsystem 11, the evaporator 31 may be configured to cool the air using the refrigerant cooled by the exterior heat exchanger 35 and expanded by the cooling-side expansion valve 15, and the air cooled by the evaporator 31 may be directed into the passenger compartment.

The compressor 32 may be configured to compress the refrigerant received from the evaporator 31 and/or a battery chiller 37. According to an exemplary embodiment, the compressor 32 may be an inverter compressor including an inverter 80.

The compressor 32 may include a compressor motor and a compression section driven by the compressor motor. The refrigerant loop 21 may be fluidly connected to the compression section of the compressor 32.

Figure 2:
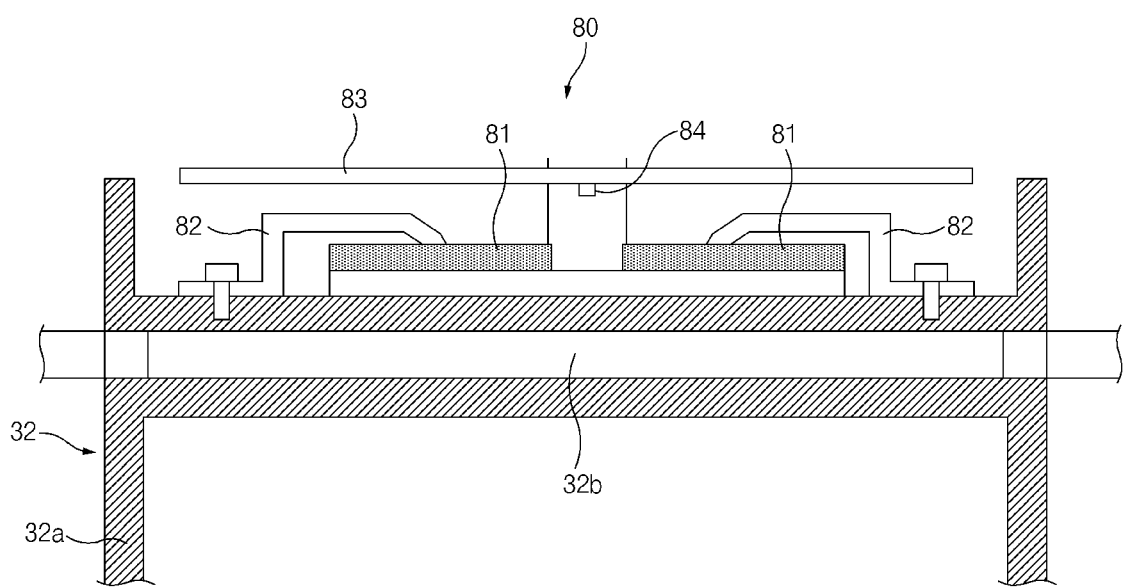
FIG. 2 illustrates an inverter of a compressor in a vehicle thermal management system according to an exemplary embodiment of the present disclosure.

Referring to FIG. 2, the compressor 32 may include a motor housing 32a covering the compressor motor, and the inverter 80 may be disposed adjacent to the motor housing 32a of the compressor 32. In the inverter 80, one or more elements 81 such as an insulated gate bipolar transistor (IGBT) may be mounted on the motor housing 32a by a clamp 82. A printed circuit board (PCB) 83 may be disposed above the element 81 and the clamp 82, and a temperature sensor 84 for sensing a temperature of the inverter 80 may be mounted on the PCB 83. The motor housing 32a may have a refrigerant passage 32b, and the refrigerant passage 32b may be connected to the refrigerant loop 21. Specifically, the refrigerant passage 32b of the motor housing 32a may be fluidly connected to an accumulator 38. As the refrigerant discharged from the accumulator 38 passes through the refrigerant passage 32b, the inverter 80 may be properly cooled by the refrigerant.

The interior condenser 33 may be configured to condense the refrigerant received from the compressor 32, and accordingly the air passing through the interior condenser 33 may be heated by the interior condenser 33. As the air heated by the interior condenser 33 is directed into the passenger compartment, the passenger compartment may be heated.

The exterior heat exchanger 35 may be disposed adjacent to a front grille of the vehicle. Since the exterior heat exchanger 35 is exposed to the outside, heat may be transferred between the exterior heat exchanger 35 and the ambient air. During the cooling operation of the HVAC subsystem 11, the exterior heat exchanger 35 may be configured to condense the refrigerant received from the interior condenser 33. That is, the exterior heat exchanger 35 may serve as an exterior condenser that condenses the refrigerant by transferring heat to the ambient air during the cooling operation of the HVAC subsystem 11. During a heating operation of the HVAC subsystem 11, the exterior heat exchanger 35 may be configured to evaporate the refrigerant received from the water-cooled heat exchanger 70. That is, the exterior heat exchanger 35 may serve as an exterior evaporator that evaporates the refrigerant by absorbing heat from the ambient air during the heating operation of the HVAC subsystem 11. In particular, the exterior heat exchanger 35 may exchange heat with the ambient air forcibly blown by a cooling fan 75 so that a heat transfer rate between the exterior heat exchanger 35 and the ambient air may be further increased.

The water-cooled heat exchanger 70 may be configured to transfer heat among the refrigerant loop 21 of the HVAC subsystem 11, the battery coolant loop 22 of the battery cooling subsystem 12, and the powertrain coolant loop 23 of the powertrain cooling subsystem 13. Specifically, the water-cooled heat exchanger 70 may be disposed between the interior condenser 33 and the exterior heat exchanger 35 in the refrigerant loop 21. The water-cooled heat exchanger 70 may include a first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC subsystem 11, the water-cooled heat exchanger 70 may be configured to evaporate the refrigerant which is received from the interior condenser 33 using heat which is received from the powertrain cooling subsystem 13. That is, during the heating operation of the HVAC subsystem 11, the water-cooled heat exchanger 70 may serve as an evaporator that evaporates the refrigerant by recovering waste heat from the electric motor 51 and the power electronics 52 of the powertrain cooling subsystem 13.

During the cooling operation of the HVAC subsystem 11, the water-cooled heat exchanger 70 may be configured to condense the refrigerant received from the interior condenser 33. The water-cooled heat exchanger 70 may serve as a condenser that condenses the refrigerant by cooling the refrigerant using the battery-side coolant circulating in the battery coolant loop 22 of the battery cooling subsystem 12 and the powertrain-side coolant circulating in the powertrain coolant loop 23 of the powertrain cooling subsystem 13.

The heating-side expansion valve 16 may be located on the upstream side of the water-cooled heat exchanger 70 in the refrigerant loop 21. Specifically, the heating-side expansion valve 16 may be disposed between the interior condenser 33 and the water-cooled heat exchanger 70. During the heating operation of the HVAC subsystem 11, the heating-side expansion valve 16 may adjust the flow of the refrigerant or the flow rate of the refrigerant into the water-cooled heat exchanger 70. The heating-side expansion valve 16 may be configured to expand the refrigerant received from the interior condenser 33 during the heating operation of the HVAC subsystem 11.

According to an exemplary embodiment, the heating-side expansion valve 16 may be an electronic expansion valve (EXV) having a drive motor 16a. The drive motor 16a may have a shaft which is movable to open or close an orifice defined in a valve body of the heating-side expansion valve 16, and the position of the shaft may be varied depending on the rotation direction, rotation degree, and the like of the drive motor 16a, and thus the opening degree of the orifice of the heating-side expansion valve 16 may be varied. A controller 100 may control the operation of the drive motor 16a. The heating-side expansion valve 16 may be a full open type EXV.

The opening degree of the heating-side expansion valve 16 may be varied by the controller 100. As the opening degree of the heating-side expansion valve 16 is varied, the flow rate of the refrigerant into the third passage 73 may be varied. The heating-side expansion valve 16 may be controlled by the controller boo during the heating operation of the HVAC subsystem 11.

The cooling-side expansion valve 15 may be disposed between the exterior heat exchanger 35 and the evaporator 31 in the refrigerant loop 21. As the cooling-side expansion valve 15 is located on the upstream side of the evaporator 31, the cooling-side expansion valve 15 may adjust the flow of the refrigerant or the flow rate of the refrigerant into the evaporator 31. During the cooling operation of the HVAC subsystem 11, the cooling-side expansion valve 15 may be configured to expand the refrigerant received from the exterior heat exchanger 35.

According to an exemplary embodiment, the cooling-side expansion valve 15 may be a thermal expansion valve (TXV) which senses the temperature and/or pressure of the refrigerant and adjusts the opening degree of the cooling-side expansion valve 15. Specifically, the cooling-side expansion valve 15 may be a TXV having a shut-off valve 15a selectively blocking the flow of the refrigerant toward an internal passage of the cooling-side expansion valve 15, and the shut-off valve 15a may be a solenoid valve. The shut-off valve 15a may be opened or closed by the controller 100, thereby blocking or unblocking the flow of the refrigerant toward the cooling-side expansion valve 15. When the shut-off valve 15a is opened, the refrigerant may be allowed to flow into the cooling-side expansion valve 15, and when the shut-off valve 15a is closed, the refrigerant may be blocked from flowing into the cooling-side expansion valve 15. According to an exemplary embodiment, the shut-off valve 15a may be mounted in the inside of a valve body of the cooling-side expansion valve 15, thereby opening or closing the internal passage of the cooling-side expansion valve 15. According to another exemplary embodiment, the shut-off valve 15a may be located on the upstream side of the cooling-side expansion valve 15, thereby selectively opening or closing an inlet of the cooling-side expansion valve 15.

When the shut-off valve 15a is closed, the flow of the refrigerant into the cooling-side expansion valve 15 may be blocked, and accordingly the refrigerant may only be directed into the battery chiller 37 without flowing into the cooling-side expansion valve 15 and the evaporator 31. That is, when the shut-off valve 15a of the cooling-side expansion valve 15 is closed, the cooling operation of the HVAC subsystem 11 may not be performed, and only the battery chiller 37 may be cooled or the heating operation of the HVAC subsystem 11 may be performed. When the shut-off valve 15a is opened, the refrigerant may be directed into the cooling-side expansion valve 15 and the evaporator 31. That is, when the shut-off valve 15a of the cooling-side expansion valve 15 is opened, the cooling operation of the HVAC subsystem 11 may be performed.

The HVAC subsystem 11 may include an HVAC housing 30 having an inlet and an outlet. The HVAC housing 30 may be configured to allow the air to be directed into the passenger compartment of the vehicle. The evaporator 31 and the interior condenser 33 may be located in the HVAC housing 30. An air mixing door 34a may be disposed between the evaporator 31 and the interior condenser 33, and a positive temperature coefficient (PTC) heater 34b may be located on the downstream side of the interior condenser 33.

The HVAC subsystem 11 may further include the accumulator 38 disposed between the evaporator 31 and the compressor 32 in the refrigerant loop 21, and the accumulator 38 may be located on the downstream side of the evaporator 31. The accumulator 38 may separate a liquid refrigerant from the refrigerant which is received from the evaporator 31, thereby preventing the liquid refrigerant from entering the compressor 32.

The HVAC subsystem 11 may further include a branch conduit 36 branching off from the refrigerant loop 21. The branch conduit 36 may branch off from an upstream point of the cooling-side expansion valve 15 and be connected to the compressor 32 in the refrigerant loop 21. The battery chiller 37 may be fluidly connected to the branch conduit 36, and the battery chiller 37 may be configured to transfer heat between the branch conduit 36 and the battery coolant loop 22 to be described below. That is, the battery chiller 37 may be configured to transfer heat between the refrigerant circulating in the HVAC subsystem 11 and the battery-side coolant circulating in the battery cooling subsystem 12.

Specifically, the battery chiller 37 may include a first passage 37a fluidly connected to the branch conduit 36 and a second passage 37b fluidly connected to the battery coolant loop 22. The first passage 37a and the second passage 37b may be adjacent to or contact each other within the battery chiller 37, and the first passage 37a may be fluidly separated from the second passage 37b. Accordingly, the battery chiller 37 may transfer heat between the battery-side coolant passing through the second passage 37b and the refrigerant passing through the first passage 37a. The refrigerant may be vaporized and superheated by absorbing heat from the battery-side coolant, and the battery-side coolant may be cooled by releasing heat to the refrigerant.

The branch conduit 36 may be fluidly connected to the accumulator 38, and the refrigerant passing through the branch conduit 36 may be received in the accumulator 38.

A chiller-side expansion valve 17 may be located on the upstream side of the battery chiller 37 in the branch conduit 36. The chiller-side expansion valve 17 may adjust the flow of the refrigerant or the flow rate of the refrigerant into the battery chiller 37, and the chiller-side expansion valve 17 may be configured to expand the refrigerant received from the exterior heat exchanger 35.

According to an exemplary embodiment, the chiller-side expansion valve 17 may be an EXV having a drive motor 17a. The drive motor 17a may have a shaft which is movable to open or close an orifice defined in a valve body of the chiller-side expansion valve 17, and the position of the shaft may be varied depending on the rotation direction, rotation degree, and the like of the drive motor 17a, and thus the opening degree of the chiller-side expansion valve 17 may be varied. That is, the controller 100 may control the operation of the drive motor 17a so that the opening degree of the chiller-side expansion valve 17 may be varied. The chiller-side expansion valve 17 may be a full open type EXV. The chiller-side expansion valve 17 may have a structure which is the same as or similar to that of the heating-side expansion valve 16.

As the opening degree of the chiller-side expansion valve 17 is varied, the flow rate of the refrigerant into the battery chiller 37 may be varied. For example, when the opening degree of the chiller-side expansion valve 17 is greater than a reference opening degree, the flow rate of the refrigerant into the battery chiller 37 may be relatively increased above a reference flow rate, and when the opening degree of the chiller-side expansion valve 17 is less than the reference opening degree, the flow rate of the refrigerant into the battery chiller 37 may be similar to the reference flow rate or be relatively lowered below the reference flow rate. Here, the reference opening degree refers to an opening degree of the chiller-side expansion valve 17 required for maintaining a target evaporator temperature, and the reference flow rate refers to a flow rate of the refrigerant which is allowed to flow into the battery chiller 37 when the chiller-side expansion valve 17 is opened to the reference opening degree. When the chiller-side expansion valve 17 is opened to the reference opening degree, the refrigerant may be directed into the battery chiller 37 at a corresponding reference flow rate.

As the opening degree of the chiller-side expansion valve 17 is adjusted by the controller 100, the flow rate of the refrigerant into the battery chiller 37 may be varied, and accordingly the flow rate of the refrigerant into the evaporator 31 may be varied. As the opening degree of the chiller-side expansion valve 17 is adjusted, the refrigerant may be distributed to the evaporator 31 and the battery chiller 37 at a predetermined ratio, and thus the cooling of the HVAC subsystem 11 and the cooling of the battery chiller 37 may be performed simultaneously or selectively.

The HVAC subsystem 11 may further include a refrigerant bypass conduit 39 connecting a downstream point of the third passage 73 of the water-cooled heat exchanger 70 and the branch conduit 36. An inlet of the refrigerant bypass conduit 39 may be connected to the downstream point of the water-cooled heat exchanger 70, and an outlet of the refrigerant bypass conduit 39 may be connected to the branch conduit 36. Specifically, the inlet of the refrigerant bypass conduit 39 may be connected to a point between the water-cooled heat exchanger 70 and the exterior heat exchanger 35, and the outlet of the refrigerant bypass conduit 39 may be connected to a point between the battery chiller 37 and the compressor 32 in the branch conduit 36. A first three-way valve 61 may be disposed at a junction between the inlet of the refrigerant bypass conduit 39 and the refrigerant loop 21. The first three-way valve 61 may be disposed between the exterior heat exchanger 35 and the water-cooled heat exchanger 70 in the refrigerant loop 21. When the first three-way valve 61 is switched to open the inlet of the refrigerant bypass conduit 39, the refrigerant exiting from the third passage 73 of the water-cooled heat exchanger 70 may be directed into the compressor 32 through the refrigerant bypass conduit 39 and the accumulator 38. That is, when the inlet of the refrigerant bypass conduit 39 is opened by the switching of the first three-way valve 61, the refrigerant may bypass the exterior heat exchanger 35. When the first three-way valve 61 is switched to close the inlet of the refrigerant bypass conduit 39, the refrigerant exiting from the third passage 73 of the water-cooled heat exchanger 70 may be directed into the exterior heat exchanger 35 without passing through the refrigerant bypass conduit 39. That is, when the inlet of the refrigerant bypass conduit 39 is closed by the switching of the first three-way valve 61, the refrigerant may pass through the exterior heat exchanger 35.

The controller 100 may control respective operations of the shut-off valve 15a of the cooling-side expansion valve 15, the heating-side expansion valve 16, the chiller-side expansion valve 17, the compressor 32, and the like, and thus the overall operation of the HVAC subsystem 11 may be controlled by the controller 100. According to an exemplary embodiment, the controller 100 may be a full automatic temperature control (FATC) system.

When the HVAC subsystem 11 operates in a cooling mode, the shut-off valve 15a of the cooling-side expansion valve 15 may be opened, and the refrigerant may sequentially circulate through the compressor 32, the interior condenser 33, the heating-side expansion valve 16, the third passage 73 of the water-cooled heat exchanger 70, the exterior heat exchanger 35, the cooling-side expansion valve 15, and the evaporator 31.

When the HVAC subsystem 11 operates in a heating mode, the shut-off valve 15a of the cooling-side expansion valve 15 may be closed, and the refrigerant may sequentially circulate through the compressor 32, the interior condenser 33, the heating-side expansion valve 16, the third passage 73 of the water-cooled heat exchanger 70, the exterior heat exchanger 35, the chiller-side expansion valve 17, the first passage 37a of the battery chiller 37, and the compressor 32. During the heating operation of the HVAC subsystem 11, when the shut-off valve 15a of the cooling-side expansion valve 15 is closed, and the inlet of the refrigerant bypass conduit 39 is opened by the switching of the first three-way valve 61, the refrigerant may sequentially circulate through the compressor 32, the interior condenser 33, the heating-side expansion valve 16, the third passage 73 of the water-cooled heat exchanger 70, and the compressor 32.

The battery cooling subsystem 12 may be configured to cool the battery pack 41 using the battery-side coolant circulating in the battery coolant loop 22. The battery coolant loop 22 may be fluidly connected to the battery pack 41, a heater 42, the battery chiller 37, a second battery-side pump 45, a battery radiator 43, a reservoir tank 48, and a first battery-side pump 44. In FIG. 1, the battery-side coolant may sequentially pass through the battery pack 41, the heater 42, the battery chiller 37, the second battery-side pump 45, the battery radiator 43, the reservoir tank 48, the second passage 72 of the water-cooled heat exchanger 70, and the first battery-side pump 44 through the battery coolant loop 22.

The battery pack 41 may have a coolant passage provided inside or outside thereof, and the battery-side coolant may pass through the coolant passage. The battery coolant loop 22 may be fluidly connected to the coolant passage of the battery pack 41.

The heater 42 may be disposed between the battery chiller 37 and the battery pack 41, and the heater 42 may heat the battery-side coolant circulating through the battery coolant loop 22 to warm-up the coolant. According to an exemplary embodiment, the heater 42 may be a water-heating heater that heats the coolant by exchanging heat with a high-temperature fluid. According to another exemplary embodiment, the heater 42 may be an electric heater.

The battery radiator 43 may be disposed adjacent to the front grille of the vehicle, and the battery-side coolant passing through the battery radiator 43 may be cooled using the ambient air forcibly blown by the cooling fan 75. The battery radiator 43 may be adjacent to the exterior heat exchanger 35.

The first battery-side pump 44 may be configured to allow the battery-side coolant to circulate through at least a portion of the battery coolant loop 22, and the second battery-side pump 45 may be configured to allow the battery-side coolant to circulate through at least a portion of the battery coolant loop 22.

The first battery-side pump 44 may be disposed at an upstream point of the battery pack 41 in the battery coolant loop 22. The first battery-side pump 44 may forcibly pump the battery-side coolant into the battery pack 41, thereby allowing the battery-side coolant to pass through the battery pack 41.

The second battery-side pump 45 may be disposed at an upstream point of the battery radiator 43 in the battery coolant loop 22. The second battery-side pump 45 may forcibly pump the battery-side coolant into an inlet of the battery radiator 43, thereby allowing the battery-side coolant to pass through the battery radiator 43.

The first battery-side pump 44 and the second battery-side pump 45 may operate individually and selectively according to the thermal condition and charging condition of the battery pack 41, the operating condition of the HVAC subsystem 11, and the like.

The reservoir tank 48 may be disposed between an outlet of the battery radiator 43 and an inlet of the first battery-side pump 44.

The battery cooling subsystem 12 may further include a first battery bypass conduit 46 allowing the battery-side coolant to bypass the battery radiator 43. The first battery bypass conduit 46 may directly connect the upstream point of the battery radiator 43 and a downstream point of the battery radiator 43 in the battery coolant loop 22.

An inlet of the first battery bypass conduit 46 may be connected to a point between the battery chiller 37 and the inlet of the battery radiator 43 in the battery coolant loop 22. Specifically, the inlet of the first battery bypass conduit 46 may be connected to a point between the battery chiller 37 and an inlet of the second battery-side pump 45 in the battery coolant loop 22.

An outlet of the first battery bypass conduit 46 may be connected to a point between the battery chiller 37 and the outlet of the battery radiator 43 in the battery coolant loop 22. Specifically, the outlet of the first battery bypass conduit 46 may be connected to a point between the inlet of the first battery-side pump 44 and an outlet of the reservoir tank 48 in the battery coolant loop 22.

As the battery-side coolant flows from the downstream side of the battery chiller 37 to the upstream side of the first battery-side pump 44 through the first battery bypass conduit 46, the battery-side coolant may bypass the second battery-side pump 45, the battery radiator 43, the reservoir tank 48, and the water-cooled heat exchanger 70, and accordingly the battery-side coolant passing through the first battery bypass conduit 46 may sequentially circulate through the battery pack 41, the heater 42, and the battery chiller 37 by the first battery-side pump 44.

The battery cooling subsystem 12 may further include a second battery bypass conduit 47 allowing the battery-side coolant to bypass the battery pack 41, the heater 42, and the battery chiller 37. The second battery bypass conduit 47 may directly connect a downstream point of the battery chiller 37 and the upstream point of the battery pack 41 in the battery coolant loop 22.

An inlet of the second battery bypass conduit 47 may be connected to a point between the outlet of the first battery bypass conduit 46 and the outlet of the battery radiator 43 in the battery coolant loop 22. Specifically, the inlet of the second battery bypass conduit 47 may be connected to a point between the outlet of the first battery bypass conduit 46 and the outlet of the reservoir tank 48 in the battery coolant loop 22.

An outlet of the second battery bypass conduit 47 may be connected to a point between the inlet of the first battery bypass conduit 46 and the inlet of the battery radiator 43 in the battery coolant loop 22. Specifically, the outlet of the second battery bypass conduit 47 may be connected to a point between the inlet of the first battery bypass conduit 46 and the inlet of the second battery-side pump 45 in the battery coolant loop 22. As the battery-side coolant flows from the downstream side of the battery radiator 43 to the upstream side of the second battery-side pump 45 through the second battery bypass conduit 47, the battery-side coolant may bypass the battery pack 41, the heater 42, and the battery chiller 37, and accordingly the battery-side coolant passing through the second battery bypass conduit 47 may sequentially circulate through the battery radiator 43, the reservoir tank 48, and the second passage 72 of the water-cooled heat exchanger 70 by the second battery-side pump 45.

The first battery bypass conduit 46 and the second battery bypass conduit 47 may be parallel to each other.

The battery cooling subsystem 12 may further include a second three-way valve 62 disposed at the inlet of the first battery bypass conduit 46. That is, the second three-way valve 62 may be disposed at a junction between the inlet of the first battery bypass conduit 46 and the battery coolant loop 22. When the second three-way valve 62 is switched to open the inlet of the first battery bypass conduit 46, a portion of the battery-side coolant (from the battery chiller 37) may pass through the first battery bypass conduit 46 so that it may bypass the battery radiator 43, and the remaining battery-side coolant (from the battery radiator 43) may pass through the second battery bypass conduit 47 so that it may bypass the battery pack 41, the heater 42, and the battery chiller 37. That is, when the inlet of the first battery bypass conduit 46 is opened by the switching of the second three-way valve 62, the battery coolant loop 22 may form a circulation loop in which the first battery bypass conduit 46 and the second battery bypass conduit 47 are independent of each other. The battery-side coolant passing through the first battery bypass conduit 46 may bypass the second battery-side pump 45, the battery radiator 43, the reservoir tank 48, and the water-cooled heat exchanger 70, and may sequentially circulate through the battery pack 41, the heater 42, and the battery chiller 37 by the first battery-side pump 44. The battery-side coolant passing through the second battery bypass conduit 47 may bypass the first battery-side pump 44, the battery pack 41, the heater 42, and the battery chiller 37, and may sequentially circulate through the battery radiator 43, the reservoir tank 48, and the water-cooled heat exchanger 70 by the second battery-side pump 45.

When the second three-way valve 62 is switched to close the inlet of the first battery bypass conduit 46, the battery-side coolant may not pass through the first battery bypass conduit 46. That is, when the inlet of the first battery bypass conduit 46 is closed by the switching of the second three-way valve 62, the battery-side coolant may circulate through the battery coolant loop 22.

The battery cooling subsystem 12 may be controlled by a battery management system no. The battery management system no may monitor the state of the battery pack 41, and perform the cooling of the battery pack 41 when the temperature of the battery pack 41 is higher than or equal to a threshold temperature. The battery management system no may transmit an instruction for the cooling of the battery pack 41 to the controller 100, and accordingly the controller 100 may control the compressor 32 to operate and control the chiller-side expansion valve 17 to open. When the operation of the HVAC subsystem 11 is not required during the cooling operation of the battery pack 41, the controller 100 may control the cooling-side expansion valve 15 to close. In addition, the battery management system no may control the operation of the first battery-side pump 44 and the switching of the second three-way valve 62 as necessary so that the battery-side coolant may bypass the battery radiator 43 and circulate through the battery pack 41 and the battery chiller 37.

The powertrain cooling subsystem 13 may be configured to cool the electric motor 51 and the power electronics 52 of the powertrain using the powertrain-side coolant circulating through the powertrain coolant loop 23. The powertrain coolant loop 23 may be fluidly connected to the electric motor 51, a powertrain radiator 53, a reservoir tank 56, the first passage 71 of the water-cooled heat exchanger 70, a powertrain-side pump 54, and the power electronics 52. In FIG. 1, the powertrain-side coolant may sequentially pass through the electric motor 51, the powertrain radiator 53, the reservoir tank 56, the first passage 71 of the water-cooled heat exchanger 70, the powertrain-side pump 54, and the power electronics 52 through the powertrain coolant loop 23.

The electric motor 51 may have a coolant passage provided inside or outside thereof, and the powertrain-side coolant may pass through the coolant passage. The powertrain coolant loop 23 may be fluidly connected to the coolant passage of the electric motor 51.

The power electronics 52 may be one or more power electronics components related to the driving of the electric motor 51, such as an inverter, an on-board charger (OBC), and a low DC-DC converter (LDC). The power electronics 52 may have a coolant passage provided inside or outside thereof, and the powertrain-side coolant may pass through the coolant passage. The powertrain coolant loop 23 may be fluidly connected to the coolant passage of the power electronics 52.

The powertrain radiator 53 may be disposed adjacent to the front grille of the vehicle, and the powertrain radiator 53 may be cooled by the ambient air forcibly blown by the cooling fan 75. The exterior heat exchanger 35, the battery radiator 43, and the powertrain radiator 53 may be disposed adjacent to each other on the front of the vehicle. The cooling fan 75 may be disposed behind the exterior heat exchanger 35, the battery radiator 43, and the powertrain radiator 53.

The powertrain-side pump 54 may be located on the upstream side of the electric motor 51 and the power electronics 52, and the powertrain-side pump 54 may allow the powertrain-side coolant to circulate in the powertrain coolant loop 23.

The powertrain cooling subsystem 13 may further include a powertrain bypass conduit 55 allowing the powertrain-side coolant to bypass the powertrain radiator 53. The powertrain bypass conduit 55 may directly connect an upstream point of the powertrain radiator 53 and a downstream point of the powertrain radiator 53 in the powertrain coolant loop 23 so that the powertrain-side coolant from an outlet of the electric motor 51 may be directed toward an inlet of the powertrain-side pump 54 through the powertrain bypass conduit 55, and thus the powertrain-side coolant may bypass the powertrain radiator 53.

An inlet of the powertrain bypass conduit 55 may be connected to a point between the electric motor 51 and the powertrain radiator 53 in the powertrain coolant loop 23. An outlet of the powertrain bypass conduit 55 may be connected to a point between the reservoir tank 56 and the power electronics 52 in the powertrain coolant loop 23. Specifically, the outlet of the powertrain bypass conduit 55 may be connected to a point between the reservoir tank 56 and the inlet of the powertrain-side pump 54 in the powertrain coolant loop 23.

The powertrain cooling subsystem 13 may further include a third three-way valve 63 disposed at the inlet of the powertrain bypass conduit 55. The powertrain-side coolant may bypass the powertrain radiator 53 through the powertrain bypass conduit 55 by the switching of the third three-way valve 63, and the powertrain-side coolant may sequentially pass through the electric motor 51, the first passage 71 of the water-cooled heat exchanger 70, and the power electronics 52 by the powertrain-side pump 54.

The reservoir tank 56 may be located on the downstream side of the powertrain radiator 53. In particular, the reservoir tank 56 may be disposed between the powertrain radiator 53 and the first passage 71 of the water-cooled heat exchanger 70 in the powertrain coolant loop 23.

In the powertrain cooling subsystem 13, the switching of the third three-way valve 63 and the operation of the powertrain-side pump 54 may be controlled by the controller 100.

Figure 3:
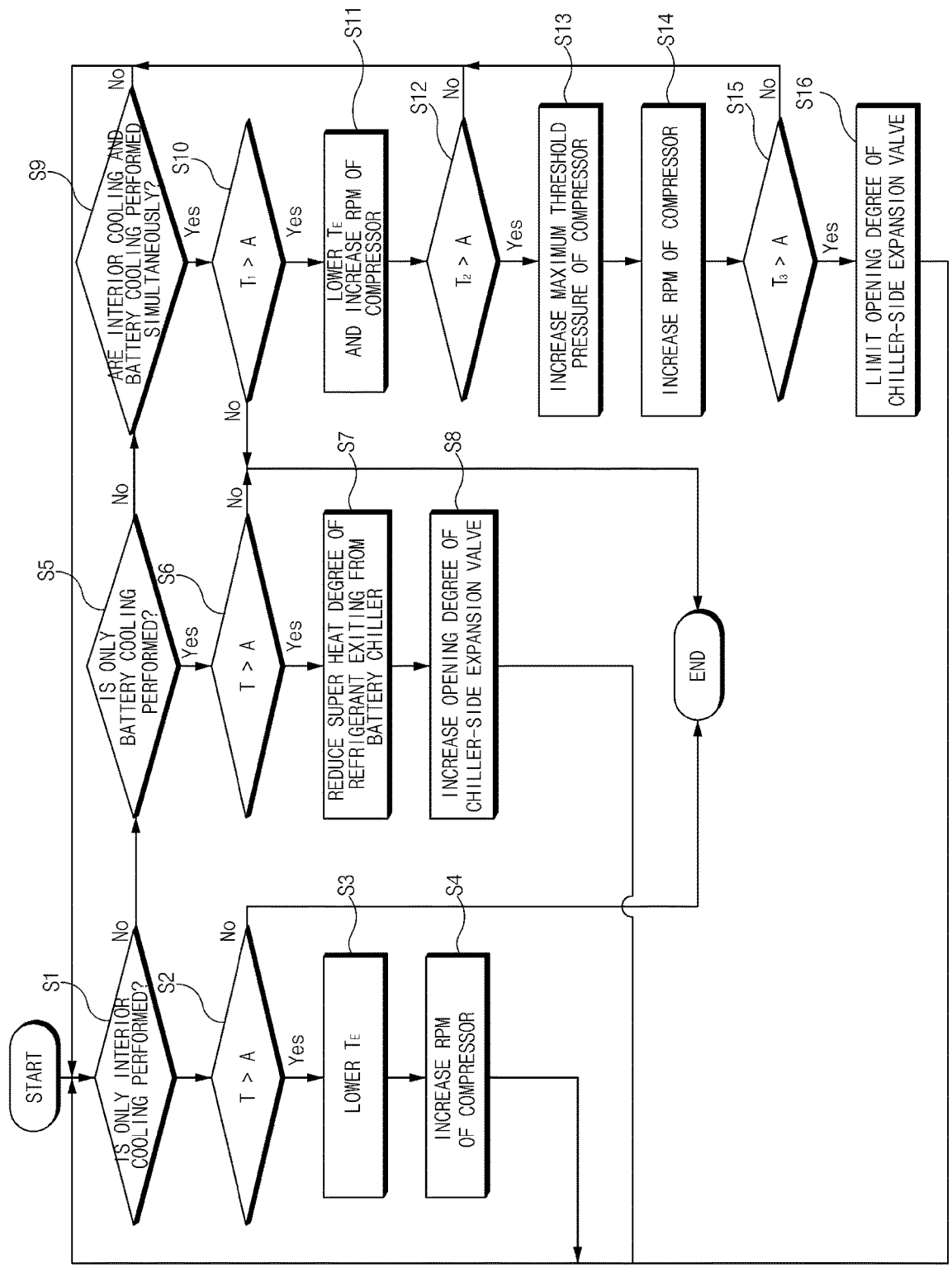
FIG. 3 illustrates a flowchart of a method for controlling a vehicle thermal management system according to an exemplary embodiment of the present disclosure.

FIG. 3 illustrates a flowchart of a method for controlling a vehicle thermal management system according to an exemplary embodiment of the present disclosure.

The controller 100 may determine whether only the interior cooling of the passenger compartment is performed as the HVAC subsystem 11 only operates in the cooling mode (S1).

When only the interior cooling of the passenger compartment is performed, it may be determined whether a temperature T of the inverter 80 measured by the temperature sensor 84 of the inverter 80 is higher than a threshold temperature A (S2). The threshold temperature A refers to a reference temperature of the inverter 80 at which the operation of the compressor 32 is stopped due to overheating of the inverter 80. For example, the threshold temperature A may be 125° C. or higher.

When the temperature T of the inverter 80 is higher than the threshold temperature A, the controller 100 may lower a target temperature $T_E$ of the evaporator 31 by subtracting a predetermined temperature from a temperature of the evaporator 31 measured by a temperature sensor (S3). The controller 100 may predetermine the target temperature $T_E$ of the evaporator 31 to correspond to a cooling temperature of the passenger compartment set by a user. That is, the target temperature $T_E$ of the evaporator 31 may be a control parameter determined by the controller 100 to match a set cooling mode of the HVAC subsystem 11.

According to a specific exemplary embodiment, the controller 100 may variably reset the target temperature $T_E$ of the evaporator 31 according to the measured temperature T of the inverter 80. The predetermined temperature may be varied according to the measured temperature T of the inverter 80. In particular, as the measured temperature T of the inverter 80 increases, the predetermined temperature may increase. For example, when the measured temperature T of the inverter 80 is 126° C., the predetermined temperature may be 1° C., and the controller 100 may subtract 1° C. from the measured temperature T of the inverter 80, thereby lowering the target temperature $T_E$ of the evaporator 31 below the predetermined target temperature of the evaporator 31. When the measured temperature T of the inverter 80 is 128° C., the predetermined temperature may be 2° C., and the controller 100 may subtract 2° C. from the measured temperature T of the inverter 80, thereby lowering the target temperature $T_E$ of the evaporator 31 below the predetermined target temperature of the evaporator 31. When the measured temperature T of the inverter 80 is 130° C., the predetermined temperature may be 3° C., and the controller 100 may subtract 3° C. from the measured temperature T of the inverter 80, thereby lowering the target temperature $T_E$ of the evaporator 31 below the predetermined target temperature of the evaporator 31.

As the target temperature $T_E$ of the evaporator 31 is reset (lowered) by the controller 100, a work amount or rate of the compressor 32 may relatively increase, and accordingly the controller 100 may increase the RPM of the compressor 32 (S4). As the RPM of the compressor 32 increases, the flow rate of the refrigerant passing through the refrigerant passage 32*b* adjacent to the inverter 80 may increase, and accordingly the inverter 80 may be properly cooled.

When it is determined in S1 that the interior cooling of only the passenger compartment is not performed, it may be determined whether only the cooling of the battery pack 41 is performed (S5).

When only the cooling of the battery pack 41 is performed, it may be determined whether the temperature T of the inverter 80 measured by the temperature sensor 84 of the inverter 80 is higher than the threshold temperature A (S6).

When the temperature T of the inverter 80 is higher than the threshold temperature A, the controller 100 may reduce a super heat degree of the refrigerant exiting from the battery chiller 37 (S7). As the refrigerant passes through the first passage 37*a* of the battery chiller 37, and the battery-side coolant passes through the second passage 37*b* of the battery chiller 37, the refrigerant may absorb heat from the battery-side coolant to thereby be vaporized and superheated, and the battery-side coolant may release heat to the refrigerant to thereby be cooled. As the temperature of the battery pack 41 increases, the controller 100 may predetermine the super heat degree of the refrigerant exiting from the battery chiller 37. That is, the super heat degree of the refrigerant exiting from the battery chiller 37 may be a control parameter determined by the controller 100 to match a cooling mode of the battery cooling subsystem 12. According to an exemplary embodiment, the super heat degree of the refrigerant may be a temperature of the refrigerant measured at an outlet of the battery chiller 37, and the temperature of the refrigerant at the outlet of the battery chiller 37 may be measured by a refrigerant sensor. For example, the controller 100 may reset the super heat degree of the refrigerant by subtracting a predetermined temperature (for example, 10° C.) from the temperature of the refrigerant measured at the outlet of the battery chiller 37, and thus the super heat degree of the refrigerant may be reduced.

As the super heat degree of the refrigerant exiting from the battery chiller 37 is reduced by the controller 100, the controller 100 may increase an opening degree of the chiller-side expansion valve 17 accordingly (S8). As the opening degree of the chiller-side expansion valve 17 increases, the flow rate of the refrigerant passing through the refrigerant passage 32*b* adjacent to the inverter 80 may increase, and accordingly the inverter 80 may be properly cooled.

When it is determined in S5 that only the cooling of the battery pack 41 is not performed, it may be determined whether the interior cooling of the passenger compartment and the cooling of the battery pack 41 are performed simultaneously (S9).

When the interior cooling of the passenger compartment and the cooling of the battery pack 41 are performed simultaneously, it may be determined whether a temperature $T_1$ of the inverter 80 measured by the temperature sensor 84 of the inverter 80 is higher than a threshold temperature A (S10). The threshold temperature A refers to a reference temperature of the inverter 80 at which the operation of the compressor 32 is stopped due to overheating of the inverter 80. For example, the threshold temperature A may be 125° C. or higher.

When the temperature $T_1$ of the inverter 80 is higher than the threshold temperature A, the controller 100 may lower a target temperature $T_E$ of the evaporator 31 by subtracting a predetermined temperature from a temperature of the evaporator 31 measured by the temperature sensor (S11). The controller 100 may predetermine the target temperature $T_E$ of the evaporator 31 to meet a cooling temperature of the passenger compartment set by the user. That is, the target temperature $T_E$ of the evaporator 31 may be a control parameter determined by the controller 100 to match a set cooling mode of the HVAC subsystem 11.

According to a specific exemplary embodiment, the controller 100 may variably reset the target temperature $T_E$ of the evaporator 31 according to the measured temperature $T_1$ of the inverter 80. The predetermined temperature may be varied according to the measured temperature $T_1$ of the inverter 80. In particular, as the measured temperature $T_1$ of the inverter 80 increases, the predetermined temperature may increase. For example, when the measured temperature $T_1$ of the inverter 80 is 125° C., the predetermined temperature may be 1° C., and the controller 100 may subtract 1° C. from the measured temperature $T_1$ of the inverter 80, thereby lowering the target temperature $T_E$ of the evaporator 31 below the predetermined target temperature of the evaporator 31. When the measured temperature $T_1$ of the inverter 80 is 128° C., the predetermined temperature may be 2° C., and the controller 100 may subtract 2° C. from the measured temperature $T_1$ of the inverter 80, thereby lowering the target temperature $T_E$ of the evaporator 31 below the predetermined target temperature of the evaporator 31. When the measured temperature $T_1$ of the inverter 80 is 130° C., the predetermined temperature may be 3° C., and the controller 100 may subtract 3° C. from the measured temperature $T_1$ of the inverter 80, thereby lowering the target temperature $T_E$ of the evaporator 31 below the predetermined target temperature of the evaporator 31. As the target temperature $T_E$ of the evaporator 31 is reset (lowered) by the controller 100, a work amount or rate of the compressor 32 may relatively increase, and accordingly the controller 100 may increase the RPM of the compressor 32 (S11). As the RPM of the compressor 32 increases, the flow rate of the refrigerant passing through the refrigerant passage 32b adjacent to the inverter 80 may increase, and accordingly the inverter 80 may be properly cooled.

After S11, a temperature $T_2$ of the inverter 80 may be secondarily measured by the temperature sensor 84, and it may be determined whether the measured temperature $T_2$ of the inverter 80 is higher than the threshold temperature A (S12).

When the temperature $T_2$ of the inverter 80 is higher than the threshold temperature A, the controller 100 may increase a maximum threshold pressure of the refrigerant compressed by the compressor 32 by a predetermined pressure (S13). When the pressure of the refrigerant compressed by the compressor 32 increases excessively, some components of the HVAC subsystem 11 may be damaged or the compressor 32 may be overloaded. In order to prevent the pressure of the refrigerant discharged from the compressor 32 from excessively increasing, the controller 100 may control the compressor 32 according to high-pressure protection logic so that the pressure of the refrigerant compressed by the compressor 32 may not exceed the maximum threshold pressure (for example, 350 psi). That is, the high-pressure protection logic may be designed to determine the maximum threshold pressure to limit the pressure of the refrigerant compressed by the compressor 32.

For example, when the vehicle performs rapid charging at a high ambient temperature or a maximum cooling operation of the passenger compartment is performed, the inverter 80 attached to the compressor may be overheated. However, since the operation of the compressor is limited by the high-pressure protection logic, the flow rate of the refrigerant for cooling the overheated inverter may be insufficient. Accordingly, the inverter 80 may be stopped, and the compressor 32 may be stopped. The controller 100 may add a predetermined pressure to the maximum threshold pressure of the refrigerant determined by the high-pressure protection logic, thereby increasing the maximum threshold pressure of the refrigerant. For example, the maximum threshold pressure of the refrigerant may increase from 350 psi to 380 psi.

The controller 100 may increase the RPM of the compressor 32 according to an increase in the maximum threshold pressure of the refrigerant (S14). As the RPM of the compressor 32 increases, the flow rate of the refrigerant passing through the refrigerant passage 32b adjacent to the inverter 80 may increase, and accordingly the inverter 80 may be properly cooled.

After S14, a temperature $T_3$ of the inverter 80 may be thirdly measured by the temperature sensor 84, and it may be determined whether the measured temperature $T_3$ of the inverter 80 is higher than the threshold temperature A (S15).

Meanwhile, when the interior cooling of the passenger compartment and the cooling of the battery pack 41 are performed simultaneously, the refrigerant may be distributed to the evaporator 31 and the first passage 37a of the battery chiller 37. Here, when the flow rate of the refrigerant into the first passage 37a of the battery chiller 37 is higher than the flow rate of the refrigerant into the evaporator 31, the temperature of the refrigerant passing through the refrigerant passage 32b adjacent to the inverter 80 may relatively increase. When the temperature of the refrigerant increases, the inverter 80 may not be properly cooled even if the flow rate of the refrigerant passing through the refrigerant passage 32b adjacent to the inverter 80 relatively increases.

According to an exemplary embodiment of the present disclosure, when the temperature $T_3$ of the inverter 80 measured in S15 is higher than the threshold temperature A, the controller 100 may limit an opening degree of the chiller-side expansion valve 17 (S16). By limiting the opening degree of the chiller-side expansion valve 17, the flow rate of the refrigerant passing through the first passage 37a of the battery chiller 37 may be relatively limited, and accordingly an increase in the temperature of the refrigerant passing through the refrigerant passage 32b adjacent to the inverter 80 may be minimized. As the measured temperature $T_3$ of the inverter 80 varies, the controller 100 may variably limit the opening degree of the chiller-side expansion valve 17. In particular, as the measured temperature $T_3$ of the inverter 80 increases, the controller 100 may variably reduce the opening degree of the chiller-side expansion valve 17. For example, when the measured temperature $T_3$ of the inverter 80 is 125° C., the controller 100 may limit the opening degree of the chiller-side expansion valve 17 to 80%. When the measured temperature $T_3$ of the inverter 80 is 130° C., the controller 100 may limit the opening degree of the chiller-side expansion valve 17 to 70%. When the measured temperature $T_3$ of the inverter 80 is 135° C., the controller 100 may limit the opening degree of the chiller-side expansion valve 17 to 60%.

As set forth above, the method for controlling a vehicle thermal management system according to exemplary embodiments of the present disclosure may be designed to temporarily reduce the flow rate and temperature of the refrigerant passing through the refrigerant passage adjacent to the inverter, thereby effectively preventing the inverter of the electric compressor from overheating.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a vehicle thermal management system, the method comprising:
    determining a target temperature of an evaporator by subtracting a predetermined temperature from a measured temperature of the evaporator in a case in which only interior cooling of a passenger compartment is performed and a measured temperature of an inverter is higher than a threshold temperature; and
    adjusting an RPM of a compressor in response to the determined target temperature of the evaporator;
    wherein the vehicle thermal management system comprises:
        a heating, ventilation, and air conditioning subsystem including a refrigerant loop through which a refrigerant circulates, wherein the refrigerant loop is fluidly connected to the evaporator, the compressor, an interior condenser, a heating-side expansion valve, a water-cooled heat exchanger, an exterior heat exchanger, and a cooling-side expansion valve;
        a battery cooling subsystem including a battery coolant loop through which a battery-side coolant circulates; and
        a powertrain cooling subsystem including a powertrain coolant loop through which a powertrain-side coolant circulates, wherein the water-cooled heat exchanger includes a first passage fluidly connected to the powertrain coolant loop, a second passage fluidly connected to the battery coolant loop, and a third passage fluidly connected to the refrigerant loop.

2. The method according to claim 1, wherein the predetermined temperature increases as the measured temperature of the inverter increases.

3. The method according to claim 1, wherein the target temperature of the evaporator is variably lowered according to the measured temperature of the inverter.

4. The method according to claim 1, further comprising directing air from the evaporator into the passenger compartment after cooling the air using the refrigerant cooled by the exterior heat exchanger and expanded by the cooling-side expansion valve.

5. The method according to claim 1, further comprising compressing, by the compressor, the refrigerant received from the evaporator or a battery chiller.

6. The method according to claim 1, wherein the compressor comprises a compressor motor and a compression section driven by the compressor motor.

7. The method according to claim 6, wherein the refrigerant loop is fluidly connected to the compression section of the compressor.

* * * * *